E. S. JOHNSON.
STOCK WATERING DEVICE.
APPLICATION FILED DEC. 20, 1917.
1,287,033.
Patented Dec. 10, 1918.
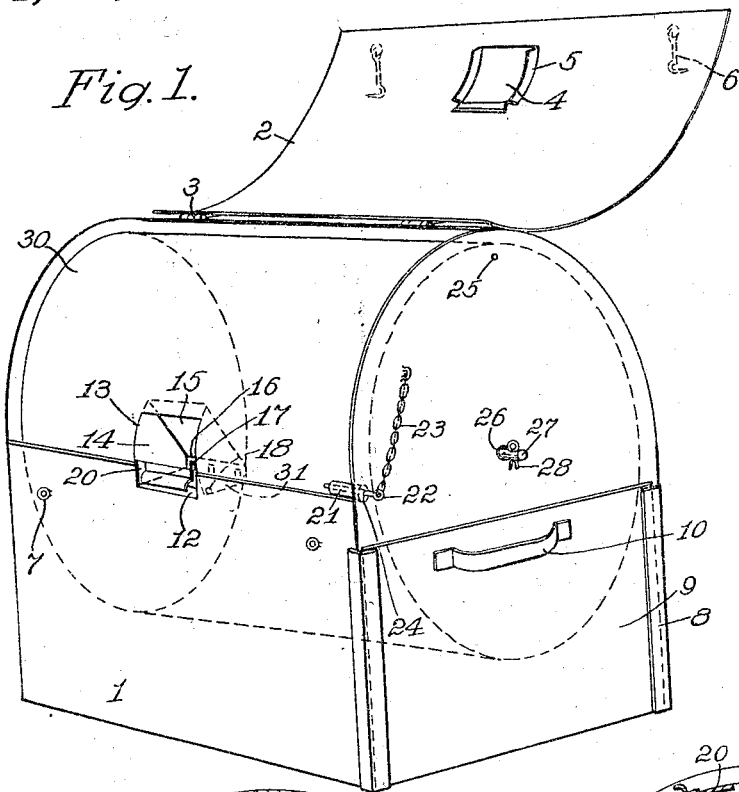
Fig. 1.
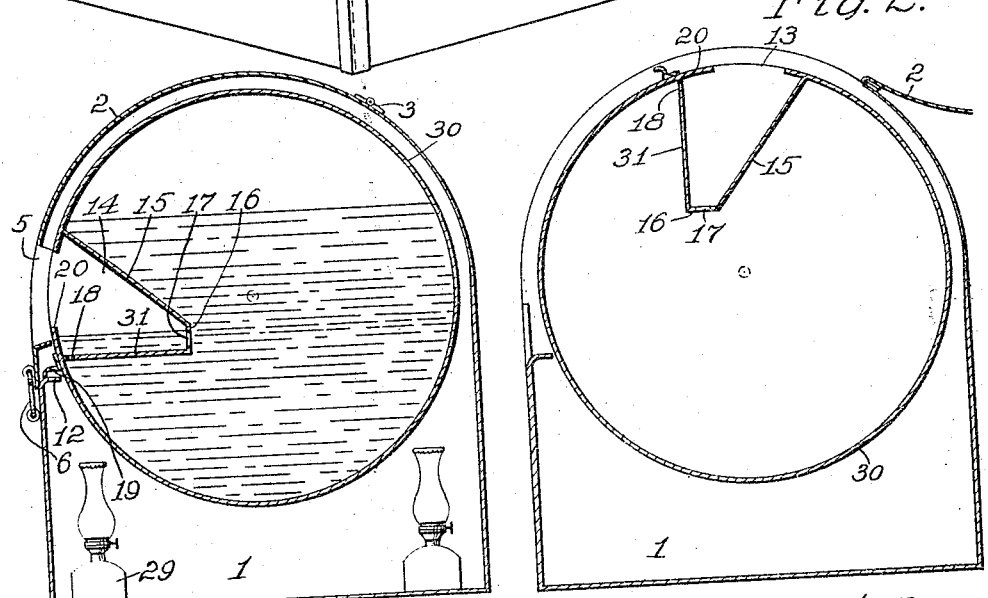
Fig. 2.
Fig. 3.
Inventor,
E. S. Johnson, by
G. C. Kennedy,
Attorney.

UNITED STATES PATENT OFFICE.

ERNEST S. JOHNSON, OF WEBSTER CITY, IOWA, ASSIGNOR OF ONE-HALF TO WILLIAM B. ROOD, OF WEBSTER CITY, IOWA.

STOCK-WATERING DEVICE.

1,287,033.

Specification of Letters Patent.    Patented Dec. 10, 1918.

Application filed December 20, 1917. Serial No. 208,010.

*To all whom it may concern:*

Be it known that I, ERNEST S. JOHNSON, a citizen of the United States of America, and a resident of Webster City, Hamilton county, Iowa, have invented certain new and useful Improvements in Stock-Watering Devices, of which the following is a specification.

My invention relates to improvements in stock watering devices, and the object of my improvement is to provide a drinking-tank or reservoir suitably mounted to be moved from one position for filling to another position for use by animals in drinking therefrom, provision being made for keeping a certain level of water in the drinking fount of the device, and for heating the water therein during cold weather.

This object I have accomplished by the means which are hereinafter described and claimed, and which are illustrated in the accompanying drawings, in which Figure 1 is a perspective view of my improved stock watering device, with swinging cover raised; Fig. 2 is a transverse medial vertical section of said device with the cover raised and the tank moved to a filling position, and Fig. 3 is a like view of the device, showing the cover fastened down, the tank in its position for watering stock, and means for warming the water in the tank in place below it.

Similar numerals of reference denote corresponding parts throughout the several views.

Referring to the drawings, the numeral 1 denotes a hollow boxing or frame, closed at the bottom, open at the top, and provided with a swinging cover 2 hinged thereto on hinges 3. Hooks 6 are suspended on the outside of said cover to releasably secure it to eyes 7 on the box 1, when the cover is lowered.

The cover 2 is provided with an opening 4 having inturned edges 5 for a purpose to be described.

The numeral 30 denotes a hollow cylindrical tank with closed ends having axial pintles 27 extended through the bearing-openings 26 in the ends of the box 1 rotatably, and secured by split-keys 28.

Midway in the cylindrical wall of said tank is located a rectangular opening 13, being the exterior opening of a fountain inclosure orificed to receive a supply of water from the interior of the tank.

Referring now to Figs. 2 and 3, the fountain or inclosure referred to consists of the top wall 15 extended inwardly obliquely, continued by a low vertical wall 16 having a plurality of orifices 17, and further continued in a return or bottom wall 31. These walls are closed in at the ends by end-walls 14. The bottom wall 31 has a small orifice 18 near the adjacent wall of the tank. The bottom wall 31 is spaced below a raised front wall or ledge 20 whose upper horizontal edge is above the orifices 17 in the vertical wall 16.

One end wall of the box 1 is removed in part, and the vertical adjacent angles of the box provided with vertical guides 8 to provide slideways for a slide cover 9 provided with an exterior handle 10. The slide cover 9 may be shifted to permit lamps 29 to be introduced within the box on opposite sides of the tank 30, to heat the water in the latter when necessary.

The numeral 21 denotes a socket fixed on the tank 30 and having its hollow in a direction to be placed in registration with either of orifices 24 or 25 in the adjacent end-wall of the box 1, so that a pin 22 suspended on a short chain 23 may be inserted in either orifice and in said socket, to hold the tank 30 in either a filling position as shown in Fig. 2, or in a position for watering stock, as shown in said Fig. 3.

The tank, in case it is to be filled, is moved to the position shown in said Fig. 2, and secured releasably in that position by the means above described. Water may then be poured through the opening 13 and plurality of ports 17 into the tank. The small orifice 18 then serving to release air. When the tank is properly filled, it is released from said securing means, moved back to the position shown in said Fig. 3, and then secured by said fastening means.

The cover 2 is then swung down, secured in place, the inwardly-directed parts 5 partially surrounding the opening 13 of the tank, and a finger-piece 19 on the tank engaging a horizontal flange 12 on the box to prevent further movement of the tank before the said fastening means has been put in place.

Said finger-piece 19 is long enough to engage with the boxing inner wall below the hinges 3 to prevent rocking of the tank backwardly beyond the limit desired.

Stock, such as hogs or other animals may drink through the opening 13 of said tank, and the water-level in the tank is maintained in the fount by reason of the vacuum in the upper part of the tank, so that a proper level of water is maintained in the tank by passage of water through the ports 17, until the water passes below the level of said ports. Any dirt or refuse which may enter the fount will pass therefrom through the ports when the tank is being refilled, from which it may be flushed periodically when the tank is disassembled from the box.

Various modifications may be made in the construction, dimensions, form and details of my improved device, without departing from the scope of this invention.

Having described my invention, what I claim as new, and desire to secure by Letters Patent, is:

1. In a device of the character described, a boxing, a tank movable from one position to another therein, said tank having an inclosure opening outwardly and provided with a port in communication with the interior of the tank, a boxing-cover hinged thereon provided with an opening, and means for releasably securing said cover to the boxing in a closed position with the cover-opening in line with the opening of the tank-inclosure when the latter is in its delivery position.

2. In a device of the character described, a boxing open at the top and having a closure for said open top, said closure having an opening with inwardly-turned flanges, a tank adapted to rock within said tank from one position to another and having a fountain inclosed therein and opening outwardly in line with said cover-opening and adapted to be surrounded by said flanges when the cover is down and the tank in its delivery position, and said fountain having an opening communicating between it and the interior of said tank.

3. In a device of the character described, a boxing having an opening, a tank adapted to rock back and forth and mounted removably within the boxing, said tank having a fountain-chamber supplied with ports in communication with the interior of the tank, said tank when in one position having its fountain-chamber opening in line with the opening in said boxing.

4. In combination, a boxing having an open top, a cover for said open top and provided with an opening, a cylindrical tank mounted to rock to and fro in said boxing from a filling to a delivery position, said tank having a port registering with the opening in said cover when the cover is closed and the tank in its delivery position, means for releasably securing said tank in either a filling or a delivery position, said tank having an inner chamber opening outwardly through said port, said chamber having a plurality of ports in communication with the interior of the tank below the said opening, and said chamber having an air-release port opening into the interior of the tank below said opening and said ports.

Signed at Webster City, Iowa, this 15th day of December, 1917.

ERNEST S. JOHNSON.

Witnesses:
F. J. ROOD,
H. R. ASH.

Copies of this patent may be obtained for five cents each, by addressing the "Commissioner of Patents, Washington, D. C."